July 17, 1928.

A. O. GRAHAM 1,677,821

BRICK MASON'S GAUGE

Filed June 4, 1924

Inventor

A. O. Graham.

By Lacy & Lacy, Attorneys

Patented July 17, 1928.

1,677,821

UNITED STATES PATENT OFFICE.

ANDREW O. GRAHAM, OF FORT WORTH, TEXAS.

BRICK-MASON'S GAUGE.

Application filed June 4, 1924. Serial No. 717,787.

This invention relates to a gauge for use by brick masons in laying courses of bricks. When bricks are laid in the usual manner, it not infrequently happens that when a number of courses have been laid and the top of a door or window frame is reached, the last laid course will not be flush with the upper side of the said frame so that the bricklayer must resort to splitting of the bricks, thus rendering the work unsightly. The present invention, therefore, has as its primary object to provide a gauge which may be employed by a bricklayer and by the use of which he may be enabled to so lay the courses of bricks that when the tops of door and window frames are reached, the last laid courses will be exactly flush with the upper surfaces of the said frames, thus overcoming the disadvantage outlined above.

Architects frequently specify in their building plans the number of courses of bricks which are to be laid in a given vertical distance as, for example, four courses to nine and one-half inches. An inexperienced bricklayer will often find difficulty in adhering strictly to the vertical distance so that the vertical distance occupied by a given number of courses may be greater or less than specified. Therefore, the present invention has as another object to provide a gauge by the use of which even inexperienced bricklayers may lay bricks in accordance with such specifications.

Figures 1, 2, 3:
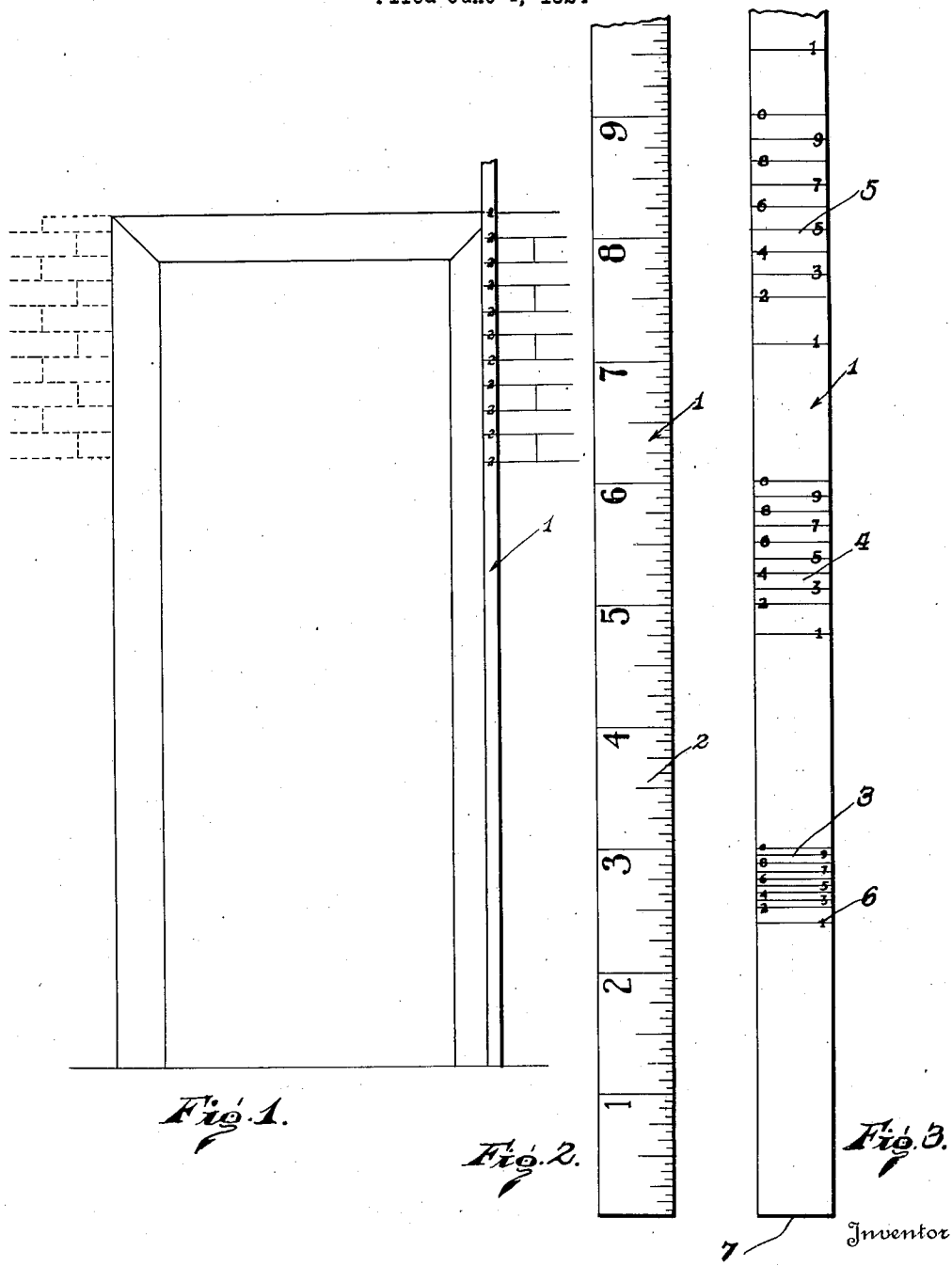
Figure 1 is a schematic view illustrating in a general way the manner in which the gauge embodying the present invention is to be employed, the view illustrating courses incorrectly laid by the old method and likewise courses of bricks correctly laid by the use of the gauge.
Figure 2 is a plan view of one side of a portion of the gauge embodying the invention.
Figure 3 is a similar view of the other side of the said gauge.

The gauge embodying the invention is indicated in general by the numeral 1 and the same may consist of a strip of metal, wood, or any other material found suitable for the purpose, or the gauge may be in the nature of a flexible strip or it may be made in sections foldably connected as in the case of the conventional folding rule. One face of the strip comprising the gauge bears a scale 2, as shown in Figure 2, representing inches and fractions of inches and in no way different from the ordinary rule. The other face of the strip, however, is differently scaled, as will be evident by reference to Figure 3 of the drawings. The two scales bear a certain relationship to each other which will presently be brought out in the description which is to follow.

In Figure 3, the numerals 3, 4 and 5 indicate groups of scale marks, there being ten marks to each group and the groups being spaced apart longitudinally of the gauge strip. The marks 3, like the marks of the other groups, are consecutively numbered from 1 to 0. The numerals designating the marks of each group are designated by the numeral 6. The numeral 7 indicates specifically one end of the strip comprising the gauge and the first mark of the group 3 is spaced from this end of the gauge strip a distance of two and three-eighths inches, as will be evident by a comparison of Figures 2 and 3, the said mark being therefore directly opposite the two and there-eighths inch mark of the scale 2. The gauge is particularly designed for use in connection with small bricks, such as those two inches in thickness, the graduations being so arranged as to allow three-eighths of an inch for the mortar joints. Between this particular scale mark and the second mark of the group 3 there is a space of one-eighth of an inch, and the successive marks of the group 3 are spaced apart a distance of one-sixteenth of an inch so that the zero or naught mark of the scale is directly opposite the three inch mark of the scale 2 or, in other words, is spaced exactly three inches from the end 7 of the gauge strip. The first mark, or the one designated "1" of the group 4 is spaced from the "1" mark of the group 3 a distance of two and three-eighths inches. Between the "1" mark of the group 4 and the "2" mark of the said group, there is an increase in the spacing to one-quarter of an inch as distinguished from the one-eighth inch spacing between the "1" mark of the group 3 and the "2" mark of said group. This increase compensates for the mortar joints between superposed bricks as they are laid in courses. Likewise, the spacing between the successive marks "2" and "3" and "4", etc., is twice the spacing between the corresponding marks of the group 3 or, in other words, is increased by one-sixteenth of an inch so that the actual spacing is one-eighth of an inch between any two adjacent ones of these marks. The "1" mark of the group 5 is spaced from the "1" mark of the group 4 a distance of two and three-eighths inches and therefore the "1" marks of all of the scale mark groups are equi-distantly spaced throughout the entire scale, it being obvious that Figure 3 does not illustrate the complete scale which may be of any desired length. The spacing between the "1" mark of the scale group 5 and "2" mark of said group is greater by one-eighth of an inch than the spacing between the corresponding marks of the group 4 so that the actual spacing between the first mentioned marks is three-eighths of an inch. This increase in spacing between the marks is continued progressively throughout the entire length of the gauge and it will be evident that such increase in spacing is likewise effected as regards the scale marks "2" and "3" and "4", etc., in successive groups. It will be observed, however, by a comparison of Figures 2 and 3 of the drawings, that the corresponding scale marks of all of the groups throughout the length of the gauge will be equi-distantly spaced. In other words, while there is a space of two and three-eighths inches between each scale mark "1" there is a distance of three inches between each of the "0" marks of the several groups. The manner of using the gauge is as follows: The gauge is disposed in vertical position against the face of the stile of the door or window frame against which the bricks are to be laid, the lower end 7 of the gauge strip resting at the sill of the said frame and being, therefore, exactly opposite or in a plane with the upper faces of the bricks constituting the course laid at the said sill. The bricklayer will then note the relationship of the upper face of the top of the door or window frame with respect to the gauge strip and will find that one or another of the marks of the scale group shown in Figure 3 will register with the door or window frame at this point. If, for example, one of the scale marks "2" is in registration with the upper side of the door or window frame, when the gauge is applied in the manner stated above and as shown in Figure 1, the bricklayer will make a pencil mark on the door frame or window frame opposite the point where each scale mark "2" appears on the scale. Having done this, he is ready to continue his laying of bricks and will lay the courses so that the brick of each course which abuts the door or window frame will have its upper side precisely in position opposite one or another of the said scale marks "2", this being continued throughout the laying of the several courses and resulting in the last laid course being flush at its upper surface with the upper surface of the top of the door or window frame. In the said Figure 1, there is illustrated in dotted lines the error which is likely to occur when bricks are laid in the ordinary manner, it being observed that the uppermost brick is split.

As heretofore stated, the two scales upon the opposite sides of the gauge strip bear relation to each other. For example, if the architect's plans should specify four courses of bricks to nine and one-half inches, the bricklayer would refer to the scale 2 shown in Figure 2, and locate the nine and one-half inch mark thereon and overturn the gauge so as to determine the scale mark opposite the said nine and one-half inch mark, and as shown in Figures 2 and 3 of the drawings, this would be the scale mark "1" of the group of marks next beyond the group 5 shown in the said Figure 3. The bricklayer would, therefore, lay the bricks in such manner as to bring the upper face of the bricks of each successive course opposite successive marks "1" upon the gauge and would, therefore, be certain that he was laying the bricks strictly in accordance with the architect's specifications.

Having thus described the invention, what I claim is:

1. A bricklaying gauge having a series of groups of scale marks thereon, the marks of each group being consecutively indicated, corresponding marks of the several groups being successively equi-distantly spaced throughout the length of the gauge, one end of the gauge constituting an abutment end for disposal against a surface from which measurements are to be taken, the first scale mark of the group adjacent the abutment end of the first group being spaced from said end a distance equal to the distance between the first marks of the several groups.

2. A bricklaying gauge having a series of groups of scale marks thereon, the marks of each group being consecutively indicated, corresponding marks of the several groups being successively equi-distantly spaced throughout the length of the gauge, one end of the gauge constituting an abutment end for disposal against a surface from which measurements are to be taken, the first scale mark of the group adjacent the abutment end of the first group being spaced from said end a distance equal to the distance between the first marks of the several groups, the marks of the several groups being progressively spaced apart a uniformly increasing distance in each successive group.

3. A bricklaying gauge adapted for vertical use having upon one face a series of groups of scale marks, the marks of each series being consecutively numbered, correspondingly numbered marks of the several groups being successively equi-distantly spaced, the marks of the several groups being progressively spaced from each other an increasing distance in each successive group and from the lower end of the gauge, the gauge having upon its other face a linear scale representing inches and fractions of inches, the highest marks of the first mentioned groups of marks being equi-distantly spaced throughout the series of groups and located opposite unit marks of the linear scale which are in arithmetical progression.

In testimony whereof I affix my signature.

ANDREW O. GRAHAM. [L. S.]